(12) United States Patent
Ford et al.

(10) Patent No.: US 6,510,424 B1
(45) Date of Patent: Jan. 21, 2003

(54) ELECTRONIC NOTIFICATION AGENT

(75) Inventors: Jeffrey V. Ford, Cary, NC (US);
Edward R. Van Vliet, Raleigh, NC (US); Robert Amezcua, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/426,173

(22) Filed: Oct. 22, 1999

(51) Int. Cl.[7] .......................... G06F 17/30; G06F 15/00
(52) U.S. Cl. ...................... 707/3; 707/1; 707/4; 707/5; 709/317
(58) Field of Search ................................ 707/3–5, 8–9, 707/513; 709/200–203, 217–219, 317; 705/5–10, 26–27

(56) References Cited

U.S. PATENT DOCUMENTS 5,893,073 A * 4/1999 Kasso et al. .................. 705/8
5,899,979 A   5/1999 Miller et al.
6,119,101 A * 9/2000 Peckover .................... 705/26

OTHER PUBLICATIONS

Website at online URL www.mobilesms.com/whatis.htm (2 pgs.). Jul. 23, 1999.

* cited by examiner

Primary Examiner—Alford W. Kindred
(74) Attorney, Agent, or Firm—Fleit, Kain, Gibbons, Gutman & Bongini P.L.; Jon A. Gibbons

(57) ABSTRACT

In a data processing system, a method for fetching information through a data network comprising: transmitting information to a client unit for causing the client unit to display a user interface enabling a user to enter user information relating to certain data items to be searched in the database and when to transmit the data items to the user; receiving the user information; creating a set of rules according to the user information received; searching at least one database for the data items specified by the user according to the rules; and transmitting the data items according to the rules. According to another embodiment the invention may be realized by a computer readable medium including programming instructions for any suitable data processing apparatus.

34 Claims, 3 Drawing Sheets

ELECTRONIC NOTIFICATION AGENT

CROSS-REFERENCE TO RELATED APPLICATIONS

Not applicable.

BACKGROUND OF THE INVENTION

1. Field of the Invention

This invention relates in general to electronic calendaring methods and in particular to an agent for processing calendar information for use in a portable data processing device.

2. Description of the Related Art

The prior art has disclosed a number and variety of interactive electronic calendaring systems and methods. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems.

Two general types of interactive electronic calendaring systems have thus evolved in the art. In one type of calendaring system, the owner of the calendar is generally also the user of the workstation and that workstation is generally not a part of a larger network.

Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring arrangements generally do not limit the type of event that is calendared nor the terminology employed at any of the entry points and, to that extent, function in the same manner as conventional manual calendars or appointment books. The electronic calendaring method and systems do have an advantage over the prior art manual calendaring of events in that the user generally has the ability to scan a time span involving a large number of days and identify calendared events quite rapidly.

Among the most common entries in calendars are travel plans. Such entries typically identify an airline, flight number, destination and departure date and time. However, that information may change and hence time must be spent confirming the information. Even with modern electronic calendars that is a time-consuming task because the most recent information is kept at a remote location that must be periodically assessed via a network. Thus, if the calendar user wishes to find the status of the flight, he or she can connect to the Internet and type in the URL of the airline that is being flown, and enter the flight number being taken and the current status is shown.

If the calendar owner wishes to find other information about the final destination, such as the weather or suggested restaurants, this information can also be found by surfing the Internet at various sites that contain this type of information. In order to perform these searches, the calendar owner must be connected to the Internet and they must find the area where the information resides, dealing with the normal Internet delays. There are ways that this is accomplished for the world of "connected devices" that involve the connected device checking the source of the data on a periodic basis and alerting the user if certain parameters are met. This is accomplished using "agent" or "macros," and are dependent upon "client" device to query the data sources that exist on the servers. For the case where the user is not at a connected client, however, the solutions are not easy to find. One solution that meets part of the need that we are aware of is the "Pager Gateway" product from Lotus. This product allows an IT administrator to configure mail to be sent to a pager when it has been forwarded to an internal mail location. This product only solves a small part of the problem identified above—the actual sending of certain types of data (E-mail). Several shortcomings exist using this solution.

The Pager Gateway sends the e-mail after it has been delivered to an internal mailbox. The user must still specify what e-mail is to be sent using another method. The suggested method is for the user to set up a Lotus Notes agent to send the e-mail to the internal mailbox. The Pager Gateway works only on Notes E-mail. The user would like to have other types of data able to be delivered using this type of method. Thus, there is a need for a method of providing data services to handheld devices that overcomes the shortcomings of the prior art.

SUMMARY OF THE INVENTION

Briefly, according to the invention an intelligent agent resides in a server-based synchronization engine. The synchronization engine performs a method for a handheld device to retrieve data directly from a server without requiring a desktop or laptop data processing system. Thus, the handheld device is connected via a wireless or wireline modem to a service provider, where the synchronization of data occurs. The synchronization only occurs occasionally, therefore the server performs a method for forwarding "urgent" data to the client device.

DETAILED DESCRIPTION OF AN EMBODIMENT

Figure 1:
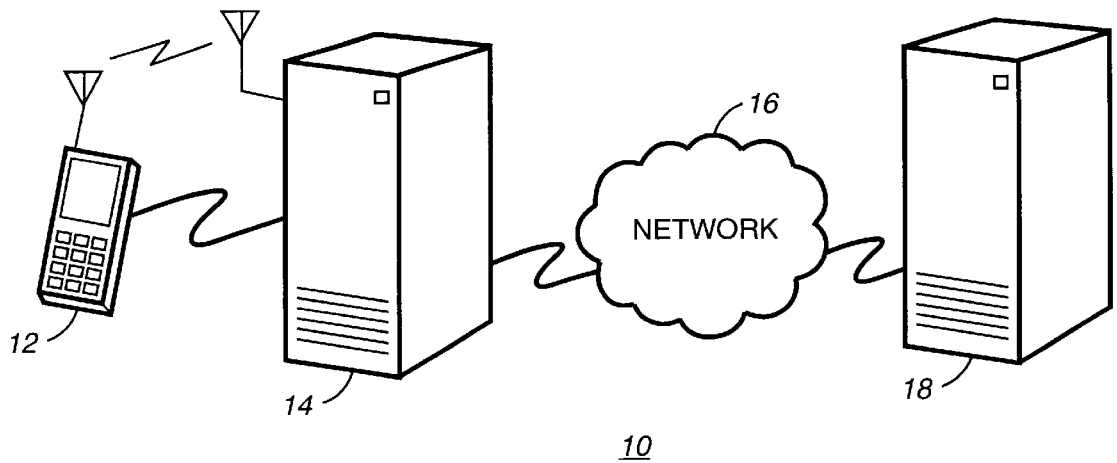
FIG. 1 is a simplified block diagram showing a system topology according to the present invention.

Referring to FIG. 1, there is shown a simplified block diagram representing the topology of a system 10 in which the invention may be advantageously used. The system 10 comprises a palmtop device 12 which is coupled to a non-mobile computer system 14 either by a radio link or cable link (both are shown). The computer system 14 is linked to the a network 16 such as an Intranet or the Internet. Other data processing systems such as server 18 are also coupled to the network 16.

The device 12 is a palmtop data processing device (e.g., a Palm Pilot, Windows CE device), a laptop, or other portable computing device. The device 12 includes an I/O interface for interacting with a user (e.g., a display, keyboard, pointing device etc.) and a network interface subsystem that may be used to communicate with remote units either via radio or wireline communication media. The current paradigm for the use of devices such as device 12 is as a PC companion. This necessitates connection of the device 12 to a desktop, floor standing computer or server 14 to synchronize the data of the handheld device 12 with that on the computer 14.

Figure 2:
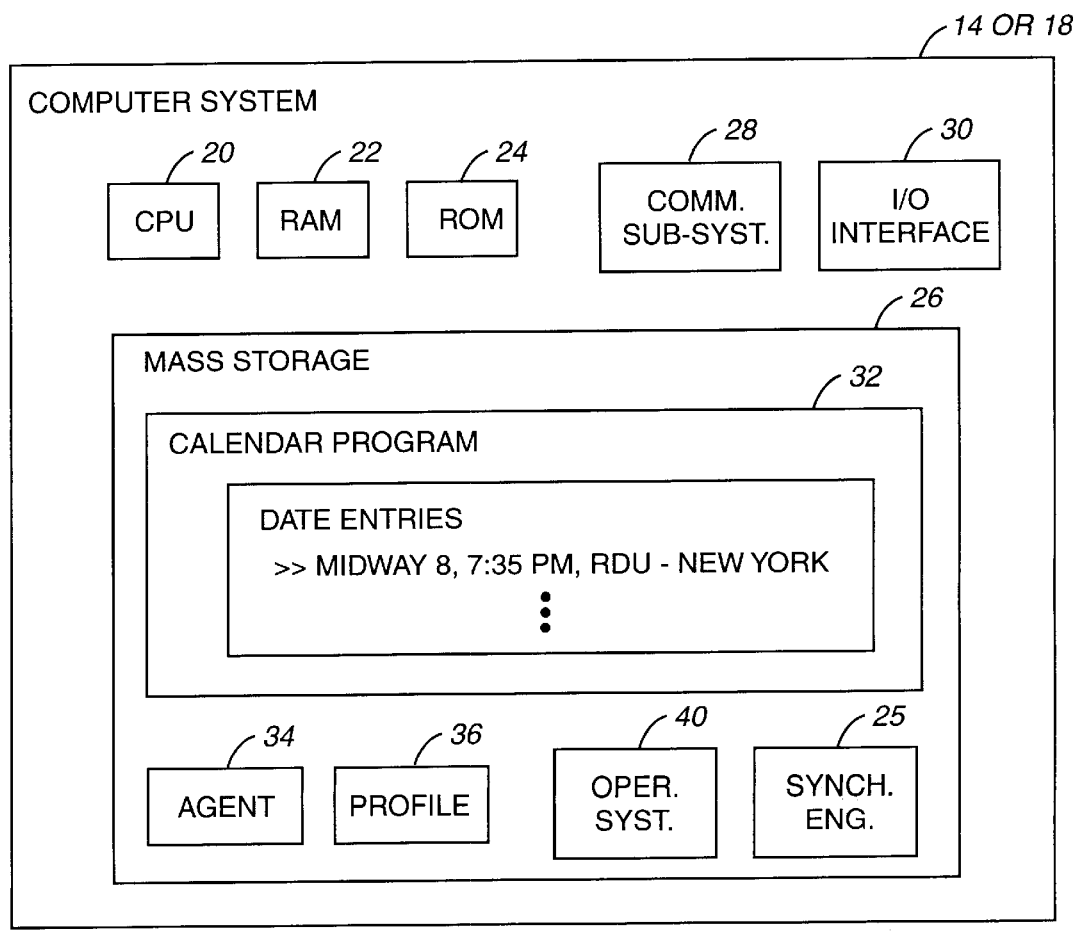
FIG. 2 is a block diagram of a data processing system according to an aspect of the invention.

Referring to FIG. 2, the computer system 14 is a desktop or server unit comprising a processor (CPU) 20, a random access memory (RAM) 22 to be used as the system working memory, a read-only memory (ROM) 24 for storing various programs such as the BIOS, and a mass storage device 26 for storing other programs. The device 26 is preferably a hard disk drive. The system 14 communicates with other devices by a communication subsystem 28 that can be used to link to a wireline network such as network 16 and a wireless link or both. The system 14 also includes an input/output interface 30 that may include a keyboard, display and mouse, and other I/O peripherals.

According to an aspect of the invention, the storage device 26 includes a calendar program, an electronic agent 34, and a user profile 36. It also includes other programs such as an operating system 40 and applications programs such as the calendar program. The calendar program 32 also includes storage space for receiving a plurality of entries for each date including scheduling information such as airline flight information.

The agent 34 runs on a periodic basis, to query new documents periodically and if a new calendar document (comprising calendar data) appears that has an originator that differs from the owner of the database (i.e., a specified user), a message is sent to a notification agent which forwards the calendar data to the specified user. The message can be forwarded in any of several ways, including a pager message, a short message under the SMS Telephone protocol, or via SMTP E-mail.

According to another aspect of the invention, the agent 34 operates with a server-based synchronization engine 25. The synchronization engine 25 includes program instructions for implementing a method for handheld device (e.g. Palm top 12) to retrieve data directly from the server 14 without requiring a desktop or laptop system. The handheld devices 12 could be connected via a wireless or wireline modem to a service provider, where the synchronization of data occurs.

Since this would happen on occasion only, there needs to be a method for forwarding the "urgent" data to the handheld device. Using plug-ins for the synchronization engine 25, the plug-in code will query information storage based on a profile provided by the user. When the criteria for urgent data are met, an e-mail containing the data is sent to a pager or SMS (short message service) phone service. This e-mail can then be viewed on the pager or phone, or optionally downloaded to the handheld device for viewing or integration into a database on the device. Some forms of data may not be viewable on the pager or SMS phone, and an alert would be sent to the user advising them to synchronize data for urgent message retrieval.

The system of the present invention:

provides the user a method (through GUI interface) to specify the data to be forwarded and the time parameters (e.g., how often to check);

works with varied types of data; the types of data included are: E-mail, Calendar entries, HTML data;

uses a server proxy that is allowing network synching of data to provide the actual processing power for the notification agent, using the same data.

Figure 3:
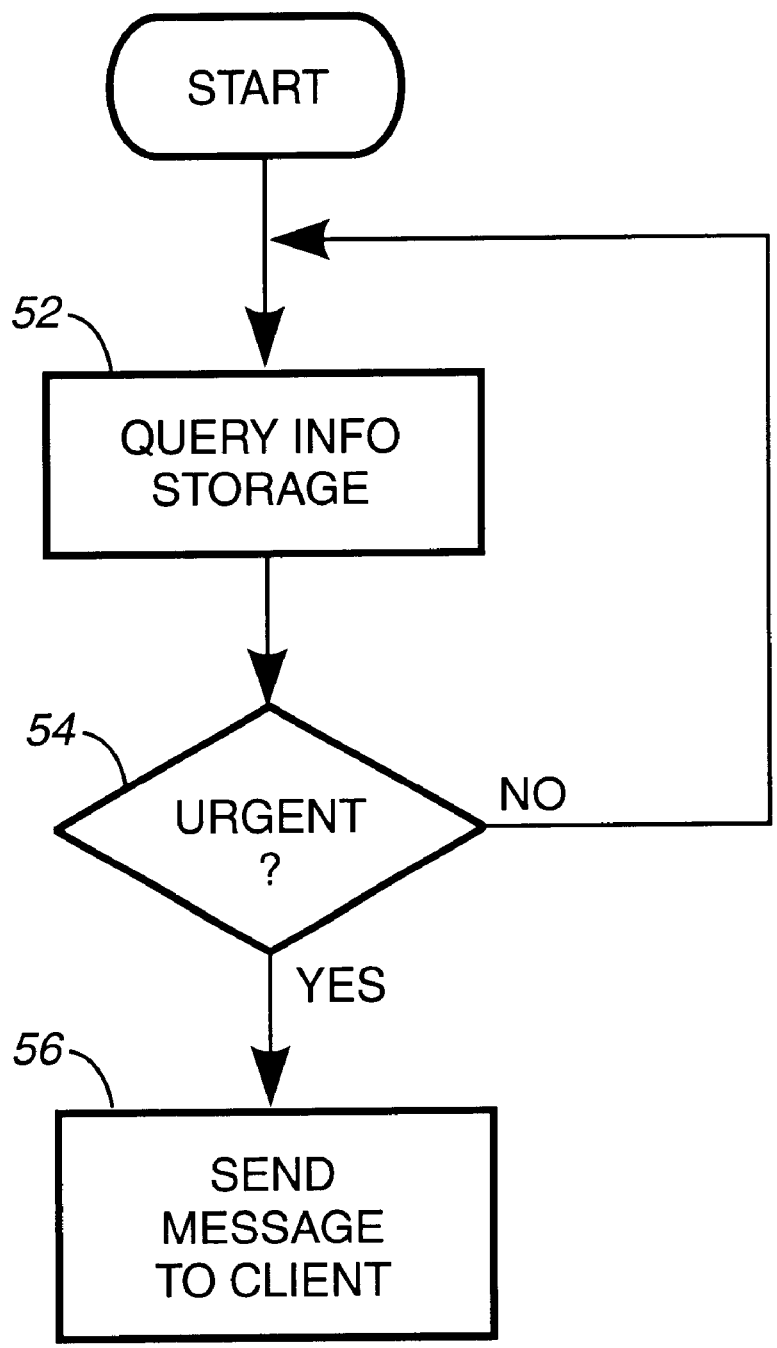
FIG. 3 is a flow chart illustrating a method according to another aspect of the invention.

Referring to FIG. 3, there is shown a flow chart 50 illustrating a method according to the invention. In step 52 a periodic query is made of the information storage to determine whether there are any new messages. A decision 54 is made to determine whether an urgent message is required. If it is not, the process continues at step 52. If an urgent message is required one is sent to the client in step 56.

Figure 4:
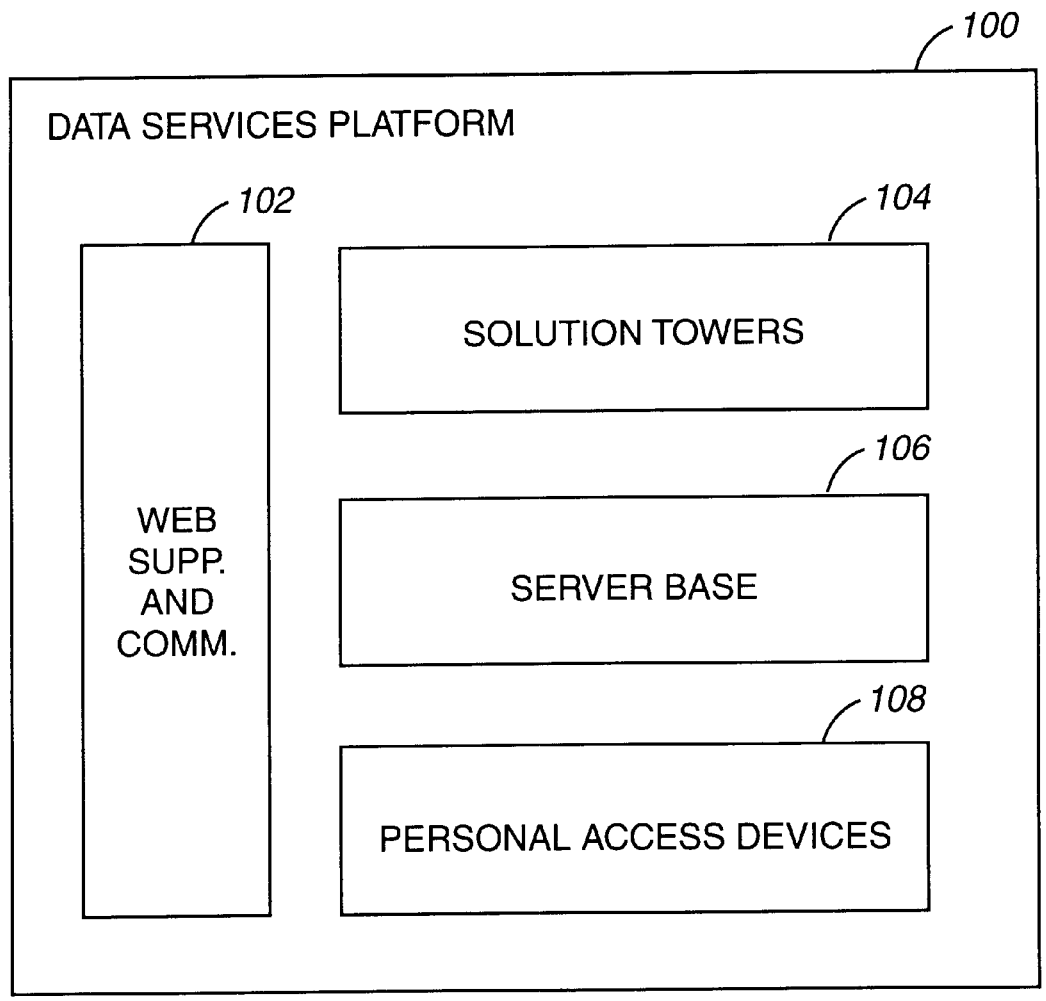
FIG. 4 is a functional diagram of a data services platform for handheld devices, according to the present invention.

Referring to FIG. 4, there is shown a data services platform 100 for handheld devices. The Notification agent is implement as part of a server synchronization engine 25. This platform comprises a Server base 106 and Solution Towers 104.

The agent 34 is implemented on top of the server base 106. The server 106 will connect to and manage communication with the handheld device 12 when it is connected. The agent 34 uses the plug-in architecture of the server base 106 to provide the user with the graphical user interface (GUI) to specify what data to keep track of, and to specify where to forward the data. The Notification agent then queries the data source periodically and, if the user conditions are met, forward the data to the specified location. The specified location should be a pager or SMS Phone SMTP address, so that the user gets the notification and the data even though the user is currently not using a client system connected to the server.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. In a data processing system, a method for fetching information through a data network comprising:

periodically querying at least one database for a first set of new documents;

identifying, in response to the step of periodically querying, a second set of documents within the first set of documents, wherein each of the documents within the second set of documents has an originator that is different than an owner of the database;

transmitting, in response to the step of identifying, a message to a client unit, wherein the client unit is associated with a user who is the owner of the database;

transmitting information to the client unit for causing the client unit to display a user interface enabling a user to enter user information relating to certain data items to be periodically searched in the database and when to transmit the data items to the user;

receiving the user information;

creating a set of rules according to the user information received;

periodically searching the at least one database for the data items specified by the user according to the rules; and transmitting the data items according to the rules.

2. The method of claim 1, wherein the user information includes information on where to transmit the data items specified by the user and the step of transmitting the data items comprises transmitting the data items to the destination provided by the user.

3. The method of claim 1, wherein the step of transmitting the data items comprises transmitting the data items to the client unit.

4. The method of claim 1, wherein the data items specified by the user comprise calendar-related data.

5. The method of claim 1, wherein the data items specified by the user are periodically updated and transmitted to the user.

6. The method of claim 1, wherein the data items are transmitted to the user using a wireless pager protocol.

7. The method of claim 5, wherein the data items are transmitted to the user using a short message service protocol.

8. The method of claim 2, wherein the data items are transmitted to the user using an SMTP E-mail protocol.

9. The data processing system of claim 1, wherein the user information includes information on where to transmit the data items specified by the user and the means for transmitting the date items comprises transmitting the data items to the destination provided by the user.

10. The data processing system of claim 1, wherein the means for transmitting the data items comprises means for transmitting the data items to the client unit.

11. The data processing system of claim 1, wherein the data items specified by the user comprise calendar-related data.

12. The data processing system of claim 1, wherein the data items specified by the user are periodically updated and transmitted to the user.

13. The data processing system of claim 1, further comprising a wireless transmitter for transmitting the data items to the user using a wireless pager protocol.

14. The data processing system of claim 1, further comprising a wireless transmitter for transmitting the data items to the user using a short message service protocol.

15. The data processing system of claim 1, further comprising a wireless transmitter for transmitting the data items to the user using an SMTP E-mail protocol.

16. The data processing system of claim 1, wherein the user information includes information on where to transmit the data items specified by the user and the instructions for transmitting the data items comprise instructions for transmitting the data items to the destination provided by the user.

17. The method of claim 1, wherein the step of periodically querying and the step of periodically searching occur with different periods.

18. The method of claim 1, wherein the message is an alert indicating the second set of documents.

19. The method of claim 1, wherein the message contains the second set of documents.

20. A data processing system comprising:
   means for periodically querying at least one database for a first set of new documents;
   identifying, in response to the step of periodically querying, a second set of documents within the first set of documents, wherein each of the documents within the second set of documents has an originator that is different than an owner of the database;
   means for transmitting, in response to the step of identifying, a message to a client unit, wherein the client unit is associated with a user who is the owner of the database;
   means for transmitting information to the client unit for causing the client unit to display a user interface enabling a user to enter user information relating to certain data items to be periodically searched in the database and when to transmit the data items to the user;
   means for receiving the user information;
   means for creating a set of rules according to the user information received;
   means for periodically searching the at least one database for the data items specified by the user according to the rules; and
   means for transmitting the data items according to the rules.

21. The system of claim 20, wherein the means for periodically querying and the means for periodically searching operate with different periods.

22. The method of claim 20, wherein the message is an alert indicating the second set of documents.

23. The method of claim 20, wherein the message contains the second set of documents.

24. A computer readable medium comprising program instructions for:
   periodically querying at least one database for a first set of new documents;
   identifying, in response to the step of periodically querying, a second set of documents within the first set of documents, wherein each of the documents within the second set of documents has an originator that is different than an owner of the database;
   transmitting, in response to the step of identifying, a message to a client unit, wherein the client unit is associated with a user who is the owner of the database;
   transmitting information to the client unit for causing the client unit to display a user interface enabling a user to enter user information relating to certain data items to be periodically searched in the database and when to transmit the data items to the user;
   receiving the user information;
   creating a set of rules according to the user information received;
   periodically searching the at least one database for the data items specified by the user according to the rules; and
   transmitting the data items according to the rules.

25. The medium of claim 24 further comprising a removable information storage medium storing the program instructions.

26. The medium of claim 24, wherein the step of transmitting the data items comprises transmitting the data items to the client unit.

27. The medium of claim 24, wherein the data items specified by the user comprise calendar-related data.

28. The medium of claim 24, wherein the data items specified by the user are periodically updated and transmitted to the user.

29. The medium of claim 24, wherein the data items are transmitted to the user using a wireless pager protocol.

30. The medium of claim 24, wherein the data items are transmitted to the user using a short message service protocol.

31. The medium of claim 24, wherein the data items are transmitted to the user using an SMTP E-mail protocol.

32. The medium of claim 24, wherein the instructions for periodically querying and the instructions for periodically searching occur with different periods.

33. The method of claim 24, wherein the message is an alert indicating the second set of documents.

34. The method of claim 24, wherein the message contains the second set of documents.

* * * * *